(12) United States Patent
Novack et al.

(10) Patent No.: US 8,283,619 B2
(45) Date of Patent: Oct. 9, 2012

(54) ENERGY HARVESTING DEVICES FOR HARVESTING ENERGY FROM TERAHERTZ ELECTROMAGNETIC RADIATION

(75) Inventors: Steven D. Novack, Idaho Falls, ID (US); Dale K. Kotter, Shelley, ID (US); Patrick J. Pinhero, Columbia, MO (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 13/179,329

(22) Filed: Jul. 8, 2011

(65) Prior Publication Data
US 2011/0277805 A1 Nov. 17, 2011

Related U.S. Application Data

(62) Division of application No. 11/939,342, filed on Nov. 13, 2007, now Pat. No. 8,071,931.

(51) Int. Cl.
*G02B 5/28* (2006.01)
(52) U.S. Cl. .................................................. 250/208.2
(58) Field of Classification Search ............... 250/208.2; 343/909
See application file for complete search history.

(56) References Cited

U.S. PATENT DOCUMENTS

| | | |
|---|---|---|
| 4,445,050 A | 4/1984 | Marks |
| 5,313,216 A | 5/1994 | Wang et al. |
| 5,381,157 A | 1/1995 | Shiga |
| 5,436,453 A | 7/1995 | Chang et al. |
| 5,712,647 A | 1/1998 | Shively |
| 5,773,831 A | 6/1998 | Brouns |
| 6,289,237 B1 | 9/2001 | Mickle et al. |
| 6,295,029 B1 | 9/2001 | Chen et al. |
| 6,373,447 B1 | 4/2002 | Rostoker et al. |
| 6,396,450 B1 | 5/2002 | Gilbert |
| 6,534,784 B2 | 3/2003 | Eliasson et al. |
| 6,756,649 B2 | 6/2004 | Moddel et al. |

(Continued)

FOREIGN PATENT DOCUMENTS
WO 2004/093497 A1 10/2004

OTHER PUBLICATIONS

Oliveria et al, Analysis of Microstrip Antenna Array with GaAS and Fenolite Substrates, 2002, IEEE Infrared and Millimeter Waves Conference Digest, pp. 91-92.*

(Continued)

*Primary Examiner* — Tony Ko
(74) *Attorney, Agent, or Firm* — TraskBritt

(57) ABSTRACT

Methods, devices and systems for harvesting energy from electromagnetic radiation are provided including harvesting energy from electromagnetic radiation. In one embodiment, a device includes a substrate and one or more resonance elements disposed in or on the substrate. The resonance elements are configured to have a resonant frequency, for example, in at least one of the infrared, near-infrared and visible light spectra. A layer of conductive material may be disposed over a portion of the substrate to form a ground plane. An optical resonance gap or stand-off layer may be formed between the resonance elements and the ground plane. The optical resonance gap extends a distance between the resonance elements and the layer of conductive material approximately one-quarter wavelength of a wavelength of the at least one resonance element's resonant frequency. At least one energy transfer element may be associated with the at least one resonance element.

19 Claims, 9 Drawing Sheets

U.S. PATENT DOCUMENTS

| | | | |
|---|---|---|---|
| 6,856,291 | B2 | 2/2005 | Mickle et al. |
| 6,870,511 | B2 | 3/2005 | Lynch et al. |
| 6,870,517 | B1 | 3/2005 | Anderson |
| 6,882,128 | B1 | 4/2005 | Rahmel et al. |
| 6,885,355 | B2 | 4/2005 | Killen et al. |
| 6,900,763 | B2 | 5/2005 | Killen et al. |
| 6,911,957 | B2 | 6/2005 | Brown et al. |
| 6,924,688 | B1 | 8/2005 | Beigel |
| 6,965,353 | B2 * | 11/2005 | Shirosaka et al. ............ 343/802 |
| 6,965,355 | B1 | 11/2005 | Durham et al. |
| 6,977,615 | B2 | 12/2005 | Brandwein, Jr. |
| 6,995,733 | B2 | 2/2006 | Waltho |
| 7,057,514 | B2 | 6/2006 | Mickle et al. |
| 7,068,225 | B2 | 6/2006 | Schantz |
| 7,070,406 | B2 | 7/2006 | Jeans |
| 7,071,889 | B2 | 7/2006 | McKinzie, III et al. |
| 7,083,104 | B1 | 8/2006 | Empedocles et al. |
| 7,084,605 | B2 | 8/2006 | Mickle et al. |
| 7,088,306 | B2 | 8/2006 | Chiang et al. |
| 7,119,161 | B2 | 10/2006 | Lawandy |
| 7,190,315 | B2 | 3/2007 | Waltho |
| 7,190,317 | B2 | 3/2007 | Werner et al. |
| 7,190,326 | B2 | 3/2007 | Voeltzel |
| 7,228,156 | B2 | 6/2007 | Gilbert |
| 7,250,921 | B1 | 7/2007 | Henry et al. |
| 7,253,426 | B2 | 8/2007 | Gorrell et al. |
| 7,256,753 | B2 | 8/2007 | Werner et al. |
| 7,329,871 | B2 | 2/2008 | Fan et al. |
| 7,436,373 | B1 | 10/2008 | Lopes et al. |
| 7,792,644 | B2 | 9/2010 | Kotter et al. |
| 8,071,931 | B2 | 12/2011 | Novack et al. |
| 2002/0171078 | A1 | 11/2002 | Eliasson et al. |
| 2003/0034918 | A1 | 2/2003 | Werner et al. |
| 2003/0079772 | A1 | 5/2003 | Gittings et al. |
| 2003/0142036 | A1 | 7/2003 | Wilhelm et al. |
| 2003/0214456 | A1 | 11/2003 | Lynch et al. |
| 2003/0230747 | A1 | 12/2003 | Ostergard |
| 2004/0028307 | A1 | 2/2004 | Diduck |
| 2004/0201526 | A1 | 10/2004 | Knowles et al. |
| 2005/0057431 | A1 | 3/2005 | Brown et al. |
| 2005/0247470 | A1 | 11/2005 | Fleming et al. |
| 2005/0253763 | A1 | 11/2005 | Werner et al. |
| 2006/0035073 | A1 | 2/2006 | Funkenbusch et al. |
| 2006/0092087 | A1 | 5/2006 | Lange |
| 2006/0125707 | A1 | 6/2006 | Waschenko |
| 2006/0194022 | A1 | 8/2006 | Boutilier et al. |
| 2006/0227422 | A1 | 10/2006 | Monacelli et al. |
| 2006/0231625 | A1 | 10/2006 | Cumming et al. |
| 2006/0267856 | A1 | 11/2006 | Voeltzel |
| 2007/0077688 | A1 | 4/2007 | Hsu et al. |
| 2007/0132645 | A1 | 6/2007 | Ginn et al. |
| 2007/0159395 | A1 | 7/2007 | Sievenpiper et al. |
| 2007/0170370 | A1 | 7/2007 | Gorrell et al. |
| 2007/0171120 | A1 | 7/2007 | Puscasu et al. |
| 2007/0176832 | A1 | 8/2007 | Qian et al. |
| 2007/0240757 | A1 | 10/2007 | Ren et al. |
| 2009/0121014 | A1 | 5/2009 | Tharp et al. |

OTHER PUBLICATIONS

Beck et al., "Microstrip antenna coupling for quantum-well infrared photodetectors," 2001, Infrared Physics & Technology, vol. 42, pp. 189-298.*

Blackburn et al., Numerical Convergence in Periodic Method of Moments Analysis of Frequency-Selective Surfaces Based on Wire Elements, Aug. 6, 2004, IEEE, vol. 53, No. 10, pp. 3308-3315.

Frost, Greg, "BC physicists transmit visible light through miniature cable," Boston college, Public release, Jan. 8, 2007, 2 pages.

Gates et al., "Unconventional Nanofabrication," Annu. Rev. Mater. Res. 2004, 34:339-72.

Hooberman, Benjamin, "Everything You Ever Wanted to Know About Frequency-Selective Surface Filters but Were Afraid to Ask," May 2005, pp. 1-22.

International Search Report from PCT/US08/83142 dated Jan. 9, 2009, 2 pages.

International Search Report from PCT/US08/83143 dated Jan. 9, 2009, 2 pages.

Jonietz, Erika, "Nano Antenna," Technology Review, <<http://www.technologyreview.com/Nanotech/16024/>> Dec. 2005, 5 pages.

Kwon et al., "Efficient Method of Moments Formulation for Large PEC Scattering Problems Using Asymptotic Phasefront Extraction (APE)," IEEE Transaction on Antennas and Propagation, vol. 49, No. 4, Apr. 2001, pp. 583-591.

Monacelli et al., "Infrared Frequency Selective Surface Based on Circuit-Analog Square Loop Design," IEEE Transactions on Antennas and Propagation, vol. 53, No. 2, Feb. 2005, pp. 745-752.

Nanotechnology and Nanomaterials News Database, "Sunlight Antenna for Solar Cells is Focus of Research Agreement," <<www.perfectdisplay.com>> Jun. 10, 2005, 1 page.

Nanotechnology News, "Carbon Nanotube Structures Could Provide More Efficient Solar Power for Soldiers," <<http://www.azonano.com/news.asp?newsID=548>> Jun. 13, 2007, 4 pages.

Nanowerk Spotlight, "Optical antenna with a single carbon nanotube," <<http://www.nanowerk.com/spotlight/spotid=1442.php>> Jun. 13, 2007, 3 pages.

News in Science, "Light excites nano-antenna," <<http://www.abc.net.au/science/news/stories/s1202875.htm>> Sep. 20, 2004, 2 pages.

Panteny et al., The Frequency Dependent Permittivity and AC Conductivity of Random Electrical Networks, 2005, Ferroelectrics, 319, pp. 199-208.

Peters et al., "Method of Moments Analysis of Anisotropic Artificial Media Composed of Dielectric Wire Objects," IEEE Transactions on Microwave Theory and Techniques, vol. 43, No. 9, Sep. 1995, pp. 2023-2027.

Peters, Timothy J., "A Quasi-Interactive Graded-Mesh Generation Algorithm for Finite Element/Moment Method Analysis on NURBS-Based Geometries," IEEE 1994, pp. 1390-1393.

Pierantoni et al., "Theoretical and Numerical Aspects of the Hybrid MOM-FDTD, TLM-IE and ARB Methods for the Efficient Modelling of EMC Problems," 29th European Microwave Conference—Munich 1999, pp. 313-316.

Rahmat-Sammii et al., "Mesh Reflector Antennas with Complex Weaves: PO/Periodic MoM and Equivalent Strip Width Verification," IEEEAC paper #1547, Version 3, Updated Dec. 3, 2006, pp. 1-9.

Research Highlights, "Catching the sun's rays with wire," DOE Pulse, No. 242, Aug. 27, 2007 (2 pages).

Science Daily, "A Sound Way to Turn Heat Into Electricity," <<http://www.sciencedaily.com/releases/2007/06/070603225026.htm>> Jun. 13, 2007, 3 pages.

Wang et al., "Receiving and transmitting light-like radio waves: Antenna effect in arrays of aligned carbon nanotubes," Applied Physics Letters, vol. 85, No. 13, Sep. 27, 2004, pp. 2607-2609.

Written Opinion of the International Searching Authority from PCT/US08/83142 dated Jan. 9, 2009, 6 pages.

Written Opinion of the International Searching Authority from PCT/US08/83143 dated Jan. 9, 2009, 7 pages.

Bailey, R. L. (1972). A proposed new concept for a solar-energy converter. Journal of Engineering for Power (73).

Berland, B. (2003). Photovoltaic Technologies Beyond the Horizon: Optical Rectenna Solar Cell. Final report, NREL Report No. SR-520-33263.

Brown, E. R. (2004). A System Level Analysis of Schottky diodes for incoherent THz imaging arrays. Solid State Electronics(p2051) vol. 48, Issue 10-11, International Semiconductor Device Research Symposium 2003.

Brown, W. (1976). Optimization of the Efficiency and Other Properties of the Rectenna Element., (pp. 142-144).

Brown, W. (1984). The History of Power Transmission by Radio Waves. Microwave Theory and Techniques, IEEE Transactions on , 32 (9), 1230-1242.

Corkish, R., Green, M. A., & Puzzer, T. (2002). Solar energy collection by antennas. Solar Energy , 73 (6), 395-401.

Eliasson, B. J. (2001). Metal-Insulator-Metal Diodes for Solar Energy Conversion. PhD Thesis, University of Colorado at Boulder, Boulder.

Fumeaux, C. Hellmann, W., et al. (1998). Nanometer thin-film Ni—NiO—Ni diodes for detection and mixing of 30 THz radiation. Infrared Physics & Technology, 39 (123-189).

Gonzalez, F., & Boreman, G. D. (2005). Comparison of dipole, bowtie, spiral and log-periodic IR antennas. Infrared Physics & Technology, 46 (5), 418-428.

Goswami, D. Y., Vijayaraghavan, S., Lu, S., & Tamm, G. (2004). New and emerging developments in solar energy. Solar Energy, 76 (1-3), 33-43.

Hartman, T. E. (1962). Tunneling of a Wave Packet. J. Appl. Phys., 33 (12), 3427-3433.

Kale, B. M. (1985). Electron tunneling devices in optics. Optical Engineering, 24 (2), 267-274.

Kazemi, H., Shinohara, K., Nagy, G., Ha, W., Lail, B., Grossman, E., et al. (2007). First THz and IR characterization of nanometer-scaled antenna-coupled InGaAs/InP.

Landsberg, P. T. and Baruch, P. (1989). The Thermodynamics of the conversion of radiation energy in photovotaics. J. Phys., 1911-1926.

Matsumoto, Y., Hanajiri, T., Toyabe, T., .& Sugano, T. (1996). Single Electron Device with Asymmetric Tunnel Barriers. Jpn. J. Appl. Phys., 35, 1126-1131.

Nagae, M. (1972). Response Time of Metal-Insulator-Metal Tunnel Junctions. Jpn. J. Appl. Phys., 11 (11), 1611-1621.

Osgood, R. M., Kimball, B. R., & Carlson, J. (2007). Nanoantenna-coupled MIM nanodiodes for efficient vis/nir energy conversion. In D. R. Myers (Ed.). 6652, p. 665203. SPIE.

Rockwell, S., Lim, D., Bosco, B., Baker, J., Eliasson, B., Forsyth, K., et al. (2007). Characterization and Modeling of Metal/Double-Insulator/Metal Diodes for Millimeter Wave Wireless Receiver Applications. Radio Frequency Integrated Circuits (RFIC) Symposium, IEEE, (pp. 171-174).

Sarehraz, M., Buckle, K., Weller, T., Stefanakos, E., Bhansali, S., Goswami, Y., et al. (2005). Rectenna developments for solar energy collection., (pp. 78-81).

Sarehraz, M. (2005). Novel rectenna for collection of infrared and visible radiation. PhD Thesis, University of South Florida.

Sanchez, A., Davis, C. F., Liu, K. C., & Javan, A. (1978). The MOM tunneling diode: Theoretical estimate of its performance at microwave and infrared frequencies. J. Appl. Phys., 49 (10), 5270-5277.

Strassner, B. H., & Chang, K. (2005). Rectifying Antennas (Rectennas). In Encyclopedia of RF and Microwave Engineering (p. 4418). John Wiley & Sons.

Monacelli et al., "Infrared frequency selective surfaces: design, fabrication and measurement," SPIE Infrared Technology and Applications XXX conference, Apr. 12-16, 2004, vol. 5406, pp. 879-886.

US 2007/0077401 A1, 04/2007, Pinto (withdrawn)

* cited by examiner

ENERGY HARVESTING DEVICES FOR HARVESTING ENERGY FROM TERAHERTZ ELECTROMAGNETIC RADIATION

CROSS-REFERENCE TO RELATED APPLICATIONS

This application is a divisional of U.S. patent application Ser. No. 11/939,342, filed Nov. 13, 2007, now U.S. Pat. No. 8,071,931, issued Dec. 6, 2011, which application is related to U.S. patent application Ser. No. 11/939,358, filed Nov. 13, 2007, now U.S. Pat. No. 7,792,644, issued Sep. 7, 2010, entitled METHODS, COMPUTER READABLE MEDIA, AND GRAPHICAL USER INTERFACES FOR ANALYSIS OF FREQUENCY SELECTIVE SURFACES, and U.S. Provisional Patent Application Ser. No. 60/987,630, filed Nov. 13, 2007, entitled ANTENNA DEVICES COMPRISING FLEXIBLE SUBSTRATES, RELATED STRUCTURES, AND METHOD OF MAKING AND USING THE SAME, the entire disclosure of each of which is hereby incorporated herein by this reference. The subject matter of this application is also related to U.S. patent application Ser. No. 13/311,874, filed Dec. 6, 2011. entitled DEVICES, SYSTEMS, AND METHODS FOR HARVESTING ENERGY AND METHODS FOR FORMING SUCH DEVICES pending and U.S. patent application Ser. No. 13/426,407, filed Mar. 21, 2012, entitled APPARATUSES AND METHOD FOR CONVERTING ELECTROMAGNETIC RADIATION TO DIRECT CURRENT, pending.

GOVERNMENT RIGHTS

This invention was made with government support under Contract No. DE-AC07-05-ID14517 awarded by the United States Department of Energy. The government has certain rights in the invention.

TECHNICAL FIELD

Embodiments of the present invention relate generally to structures and methods for harvesting energy from electromagnetic radiation and, more specifically, for nanostructures and related methods and systems for harvesting energy from, for example, the infrared, near-infrared and visible spectrums and capturing millimeter and Terahertz energy.

BACKGROUND

Conventionally, energy harvesting techniques and systems are focused on renewable energy such as solar energy, wind energy, and wave action energy. Solar energy is conventionally harvested by arrays of solar cells, such as photovoltaic cells, that convert radiant energy to DC power. Such energy collection is limited in low-light conditions such as at night or even during cloudy or overcast conditions. Conventional solar technologies are also limited with respect to the locations and orientations of installment. For example, conventional photovoltaic cells must be installed such that the light of the sun strikes them at specific angles such that they are receiving relatively direct incident radiation.

Additionally, current photovoltaic cells are relatively large and are limited in where they may be installed. As such, while providing some utility in harvesting energy from the electromagnetic radiation provided by the sun, current solar technologies are not yet developed to take full advantage of the potential electromagnetic energy available. Further, the apparatuses and systems used in capturing and converting solar energy are not particularly amenable to installation in numerous locations or situations.

Moreover, photovoltaic cells are conventionally limited to collection of energy in a very narrow band of light (e.g., approximately 0.8 micrometer to 0.9 micrometer ($\mu m$) wavelengths). The spectrum of potentially available electromagnetic energy is much greater than the narrow band in which conventional photovoltaic cells operate. For example, electromagnetic energy provided by the sun falls within the wavelength spectrum of approximately 0.1 $\mu m$ to approximately 6 $\mu m$. Additionally, energy absorbed by the earth and reradiated (e.g., at night) falls within the wavelength spectrum of approximately 3 $\mu m$ to approximately 70 $\mu m$. Current energy harvesting technologies fail to take advantage of such available energy.

Turning to another technology, frequency selective surfaces (FSSs) are used in a wide variety of applications including radomes, dichoric surfaces, circuit analog absorbers, and meanderline polarizers. An FSS is a two-dimensional periodic array of electromagnetic antenna elements. Such antenna elements may be in the form of, for example, conductive dipoles, loop patches, slots or other antenna elements. An FSS structure generally includes a metallic grid of antenna elements deposited on a dielectric substrate. Each of the antenna elements within the grid defines a receiving unit cell.

An electromagnetic wave incident on the FSS structure will pass through, be reflected by, or be absorbed by the FSS structure. This behavior of the FSS structure generally depends on the electromagnetic characteristics of the antenna elements, which can act as small resonance elements. As a result, the FSS structure can be configured to perform as low-pass, high-pass, or dichoric filters. Thus, the antenna elements may be designed with different geometries and different materials to generate different spectral responses.

Conventionally, FSS structures have been successfully designed and implemented for use in radio frequency (RF) and microwave frequency applications. As previously discussed, there is a large amount of renewable electromagnetic radiation available that has been largely untapped as an energy source using currently available techniques. For instance, radiation in the ultraviolet (UV), visible, and infrared (IR) spectra are energy sources that show considerable potential. However, the scaling of existing FSSs or other similar structures for use in harvesting such potential energy sources comes at the cost of reduced gain for given frequencies.

Additionally, scaling FSSs or other transmitting or receptive structures for use with, for example, the IR or near-IR spectra presents numerous challenges due to the fact that materials do not behave in the same manner at the so-called "nano-scale" as they do at scales that enable such structures to operate in, for example, the radio frequency (RF) spectra. For example, materials that behave homogenously at scales associated with the RF spectra often behave inhomogenously at scales associated with the IR or near-IR spectra.

There remains a desire in the art to improve upon existing technologies and to provide methods, structures and systems associated with harvesting energy including structures, methods and systems that provide access to greater bands of the electromagnetic spectrum and, thus greater access to available, yet-unused energy sources.

BRIEF SUMMARY OF THE INVENTION

In one embodiment of the present invention, an energy harvesting device is provided. The energy harvesting device includes a substrate and at least one resonance element associated with the substrate. The at least one resonance element is configured to have a resonant frequency between approximately 20 THz and approximately 1,000 THz. A layer of conductive material substantially covers a surface of the substrate. An optical resonance gap extends a distance between the at least one resonance element and the layer of conductive material of approximately one-quarter wavelength of a wavelength of the at least one resonance element's resonant frequency. At least one energy transfer element is associated with the at least one resonance element.

In accordance with another embodiment of the present invention, another energy harvesting device is provided. The energy harvesting device includes a ground plane, a first substrate disposed on a first side of the ground plane and a second substrate disposed on a second, opposing side of the ground plane. At least a first resonance element is associated with the first substrate and located on the first side of the ground plane. The first resonance element is sized and configured to have a resonant frequency between approximately 20 THz and approximately 1,000 THz. At least a second resonance element is associated with the second substrate and located on the second, opposing side of the ground plane. The second resonance element is sized and configured to have a resonant frequency different from the resonant frequency of the at least a first resonance element.

In accordance with yet another embodiment of the present invention, a method of harvesting energy is provided. The method includes providing at least one resonance element formed of an electrically conductive material and having a resonant frequency between approximately 20 THz and approximately 1,000 THz. The at least one resonance element is exposed to electromagnetic radiation having a frequency substantially the same as the resonant frequency. At least a first portion of the electromagnetic radiation is absorbed by the at least one resonance element. At least a second portion of the electromagnetic radiation is reflected off of a defined surface. At least a portion of the at least a second portion of the electromagnetic radiation is absorbed by the at least one resonance element. Induced AC (alternating current) energy is transferred via an energy transfer element.

In accordance with another embodiment of the present invention, another method of harvesting energy is provided. The method includes providing at least one resonance element formed of an electrically conductive material and exposing the at least one resonance element to electromagnetic radiation radiated from the earth. Resonance is induced in the at least one resonance element to produce AC energy. The AC induced energy is transferred from the at least one resonance element via at least one energy transfer element.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to practice the invention. It should be understood; however, that the detailed description and the specific examples, while indicating examples of embodiments of the invention, are given by way of illustration only and not by way of limitation. From this disclosure, various substitutions, modifications, additions, rearrangements, or combinations thereof within the scope of the present invention may be made and will become apparent to those skilled in the art.

Embodiments of the present invention provide methods, structures and systems for harvesting energy from electromagnetic radiation including, for example, harvesting energy from radiation in the infrared, near-infrared and visible light spectra.

Nano electromagnetic concentrator (NEC) structures may include an array or other periodic arrangement of resonant structures (also referred to as antennas, micro-antennas, and nano-antennas). It is noted that NEC structures may include, but are not limited to, FSS structures. Generally, the NEC structures may be formed by a conductive material formed in a specific pattern on a dielectric substrate to create the resonance elements. These NEC structures may be used for spectral modification of reflected or transmitted incident radiation. The resonant properties of these structures are largely dependent on the structure's layout in terms of shape, dimension, periodicity, the structure's material properties, and optical parameters of the surrounding media. It has been demonstrated that by varying the NEC geometry, material properties, or combinations thereof, it is possible to tune the resonance of an NEC structure to meet specific design requirements. However, as previously noted, attempts to scale NEC structures for use in, for example, the infrared (IR), near-IR and visible light spectra have posed particular problems because of the inhomogenous behavior of materials at the scales necessary to function at such wavelengths and frequencies.

Figure 1:
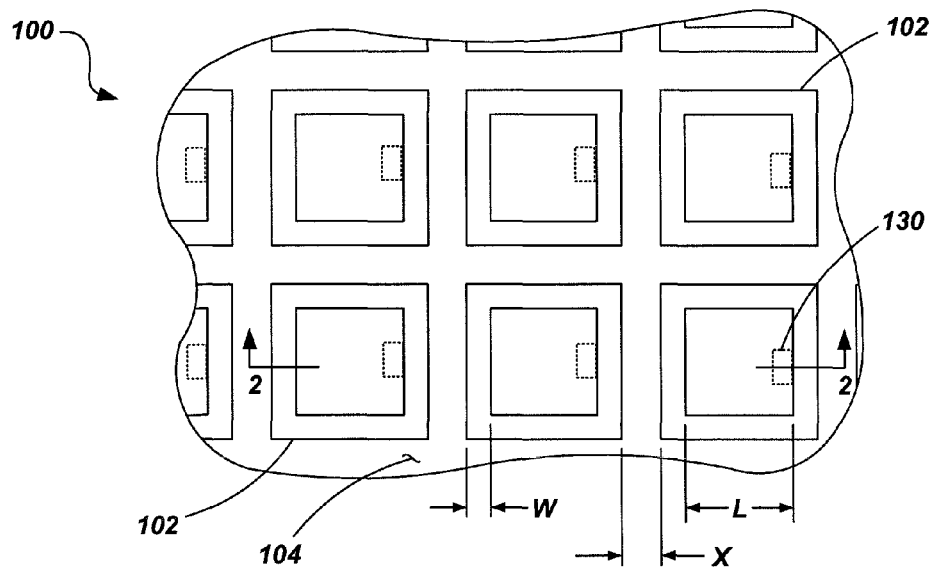
FIG. 1 is a partial plan view of a device including an array of elements used to harvest energy from electromagnetic radiation in accordance with an embodiment of the present invention.

Referring to FIG. 1, a partial plan view, or top view, of an energy harvesting device 100 (sometimes referred to herein as apparatus) is shown that includes various resonance structures or elements 102 (sometimes referred to herein as nanoantennas) formed in a substrate 104. In the embodiment described with respect to FIG. 1, the resonance elements 102 are shown as exhibiting substantially square loop geometries. However, as will be shown with other embodiments described herein, the resonance elements 102 may exhibit other geometries and the example embodiments described herein are not to be taken as limiting with respect to such potential geometries.

Figure 2:
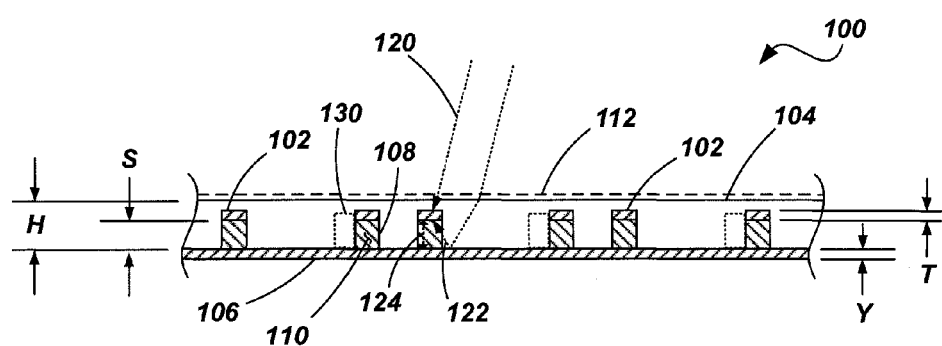
FIG. 2 is a cross-sectional view of a portion of the device as indicated by section line 2-2 as shown in FIG. 1.

With continued reference to FIG. 1, FIG. 2 is a cross-sectional view of the device 100 shown in FIG. 1. As seen in FIG. 2, the resonance elements 102 may be partially disposed within the substrate 104. In other embodiments, such resonance elements 102 may be substantially on an exterior surface of substrate 104. A ground surface or ground plane 106 may be formed, for example, on a surface of the substrate 104 at a desired distance from the resonance elements 102. Cavities 108 may be formed in the substrate 104 between resonance elements 102 and the ground plane 106. In one embodiment, the cavities 108 may be substantially unfilled (or, in other words, filled with air), or they may be filled with a desired substance, including dielectric material 110, that exhibits, for example, one or more desired optical properties or characteristics. In one embodiment, the distance S extending between the resonance elements 102 and the ground plane 106 (which distance may also be the height of the cavities 108), may be approximately equal to one-quarter (¼) of a wavelength of an associated frequency at which the resonance elements 102 are intended to resonate. This spacing forms what may be termed an optical resonance gap or an optical resonance stand-off layer between the resonance elements 102 and the ground plane 106.

The resonance elements 102 may be formed of an electrically conductive material. The conductive material may include, for example, a metal or combination of metals such as manganese (Mn), gold (Au), silver (Ag), copper (Cu), aluminum (Al), platinum (Pt), nickel (Ni), iron (Fe), lead (Pb), tin (Sn), or any other suitable electrically conductive material. In one embodiment, the conductivity of the material used to form the resonance elements 102 may be from approximately $1.0 \times 10^6$ $Ohms^{-1}\text{-}cm^{-1}$ to approximately $106.0 \times 10^6$ $Ohms^{-1}\text{-}cm^{-1}$.

Additionally, as noted above, the resonance elements 102 may exhibit a variety of geometries. As non-limiting examples, such geometries may include circular loops, concentric loops, square spirals, circular spirals, slots, and crosses. Moreover, an energy harvesting device 100 may include numerous different geometries of resonance elements 102 formed on or in the substrate 104.

The substrate 104 of the device 100 may include a dielectric material. As non-limiting examples, the substrate 104 may comprise a semiconductor-based material including silicon, silicon-on-insulator (SOI) or silicon-on-sapphire (SOS) technology, doped and undoped semiconductor materials, epitaxial layers of silicon supported by a base semiconductor foundation, and other semiconductor structures. In addition, the semiconductor material need not be silicon-based, but may be based on silicon-germanium, silicon-on-insulator, silicon-on-sapphire, germanium, or gallium arsenide, among others.

As other non-limiting examples, the substrate 104 may comprise a flexible material selected to be compatible with energy transmission of a desired wavelength, or range of wavelengths, of light. The substrate 104 may be formed from a variety of flexible materials such as a thermoplastic polymer or a moldable plastic. By way of other non-limiting examples, the substrate 104 may comprise polyethylene, polypropylene, acrylic, fluoropolymer, polystyrene, poly methylmethacrylate (PMMA), polyethylene terephthalate (MYLAR®), polyimide (e.g., KAPTON®), polyolefin, or any other material suitable for use as a substrate 104. In additional embodiments, the substrate 104 may comprise a binder with nanoparticles distributed therein, such as silicon nanoparticles distributed in a polyethylene binder, or ceramic nanoparticles distributed in an acrylic binder. Any type of substrate 104 may be used as long as it is compatible with the transmission of a desired wavelength within the spectrum of electromagnetic radiation.

The ground plane 106 may also be formed of an electrically conductive material. The conductive material may include, for example, a metal or combination of metals such as manganese (Mn), gold (Au), silver (Ag), copper (Cu), aluminum (Al), platinum (Pt), nickel (Ni), iron (Fe), lead (Pb), tin (Sn), or any other material suitable for use as an electrically conductive material. The ground plane 106 may also exhibit surface properties that make it a good optical reflector, with minimal diffusion and scattering of the electromagnetic energy. In one embodiment, the conductivity of the material used to form the resonance elements 102 may be from approximately $40.0 \times 10^6$ $Ohms^{-1}\text{-}cm^{-1}$ to approximately $106.0 \times 10^6$ $Ohms^{-1}\text{-}cm^{-1}$. Additionally, the ground plane 106 may exhibit a reflectivity of approximately 95% or greater over the full bandwidth of intended operation of the device 100.

As noted hereinabove, in one embodiment, the cavities 108 may simply be filled with air. The use of air may provide desirable performance characteristics of the device 100 with respect to optical refraction and permittivity at locations extending immediately between the resonance elements 102 and the ground plane 106. However in other embodiments, a dielectric material 110 may be disposed within the cavity 108. For example, the cavities 108 may include a material 110 such as silicon nanoparticles dispersed in a polyethylene binder, silicon dioxide ($SiO_2$), alumina ($Al_2O_3$), aluminum oxynitride (AlON), or silicon nitride ($Si_3N_4$). In additional embodiments, material such as polymers, rubbers, silicone rubbers, cellulose materials, ceramics, glass, or crystals may be disposed in the cavities 108.

In some embodiments, an overcoat or protective layer may be formed on one or more surfaces of the device 100. For example, a protective layer 112 (shown by dashed lines in FIG. 2) may comprise a flexible material such as polyethylene, silicon nanoparticles dispersed in a polyethylene binder, polypropylene, MYLAR® polymer, or KAPTON® polymer. In some embodiments, the protective layer 112 may be configured to protect one or more components of the device 100 from environmental damage, such as corrosion caused by moisture or caustic chemicals. The material used to form the protective layer 112 may be based on desired electro-optic properties so as to enhance transmission, or at least not impede transmission, of electromagnetic radiation to the resonance elements 102, the ground plane 106 and the cavities 108. In this manner, the overcoat may be used to emulate environmental conditions that could otherwise influence the resonance properties of the resonance elements 102.

It is noted that, in some instances, the protective layer 112 might introduce some undesirable behavior in the solar region, including trapped antenna grating lobes resulting in loss of energy and a reduction in omni-directional reception of solar energy or other electromagnetic radiation. As such, an anti-reflective coating may be used to compensate for these undesirable features in accordance with one embodiment of the present invention.

In one embodiment, a coating may be applied as a final "top coat" and may be sputtered on using, for example, a plasma-enhanced chemical vapor deposition (PECVD) process. The coating may be applied as a thin-film having a tailored refractive index. Materials from which the top coat may be formed include, for example, silicon nitride, titanium dioxide, and amorphous silicon. The thickness of the protective layer 112 may be selected to produce destructive interference in undesired reflected energy and constructive interference in the desired transmitted energy. In some embodiments, protective layer 112 may be manufactured as a separate layer and subsequently over-laid and adhered to the device 100.

The energy harvesting device 100 may be manufactured using a variety of techniques including a variety of semiconductor fabrication techniques, nanofabrication techniques and other processes as will be recognized by those of ordinary skill in the art depending, in part, on the materials used to form the device 100.

Still referring to FIGS. 1 and 2, one particular embodiment of the invention may include a substrate 104 formed of polyethylene, with the resonance elements 102 and the ground plane 106 formed of gold. The cavities 108 may be filled with air or with a material 110 including silicon nanoparticles dispersed in a polyethylene binder. It is noted that the use of polyethylene as a substrate 104 (or other similar material) provides the device 100 with flexibility such that it may be mounted and installed in a variety of locations and adapted to a variety of uses.

The dimensions of the various components may vary depending, for example, on the frequency at which the resonance elements 102 are desired to resonate and the materials used to form the various components of the device 100. For example, in one embodiment, the thickness H of the substrate 104 may be from 3 µm to approximately 15 µm. The width W of the traces or individual elements forming the resonance elements 102 may be from approximately 100 nanometers (nm) to approximately 400 nm. In one particular example, the width W may be from approximately 200 nm to approximately 300 nm. The thickness T of the resonance elements 102 may be from approximately 30 nm to approximately 150 nm. The inside length L between traces or individual elements of a given resonance element 102 may be from approximately 1 µm to approximately 10 µm. The distance X between individual resonance elements 102 may be from approximately 100 nm to approximately 400 nm. In one particular example, the distance X between resonance elements 102 may be from approximately 200 nm to approximately 300 nm. The thickness Y of the ground plane 106 may be approximately 20 nm to approximately 1 µm.

Various geometries and dimensions of components of the device 100 may be determined, for example, using appropriate modeling techniques. For example, U.S. Pat. No. 7,792,644, titled "METHODS, COMPUTER READABLE MEDIA, AND GRAPHICAL USER INTERFACES FOR ANALYSIS OF FREQUENCY SELECTIVE SURFACES," describes a method of analyzing structures and components that may be used as an NEC (such as the device 100 of the presently described embodiments) and determining the response of such structures using, in one example, a Periodic Method of Moments analysis and taking into consideration a number of different variables such as anticipated operational frequencies, material properties, and component dimensions.

During operation of the energy harvesting device 100, the device 100 may be exposed to electromagnetic radiation such as, for example, that which is provided by the sun or that which is reradiated by the earth after having absorbed energy from the sun. Some of the radiation will be absorbed by the resonance elements 102 as incident radiation and as indicated by reference numeral 120. In one embodiment, the resonance elements 102 are configured to resonate at a frequency that corresponds with the frequency of the radiation to which the energy harvesting device 100 is exposed. For example, the resonance elements 102 may be configured to resonate at a frequency in one of the infrared, near-infrared, or visible light spectra. In one embodiment, the resonance elements 102 may be configured with a resonant frequency of between approximately 20 Terahertz (THz) and approximately 1,000 THz (or at wavelengths of approximately 0.3 µm to approximately 15.0 µm), which corresponds generally to the visible to the mid-infrared spectrum.

As such, an electrical resonance takes place in the resonance elements 102 such that electrons on the surface of the resonance elements 102 oscillate and produce an electrical current. Radiation that is not immediately absorbed by the resonance elements 102 may pass through the substrate 104 and reflect off of the ground plane 106. Some of the reflected radiation may then be absorbed by the resonance elements 102 as indicated by reference numeral 122. Some of the radiation that is reflected, but not immediately absorbed, may resonate within the optical resonance gap as indicated by reference numeral 124. The optical resonance gap or stand-off layer helps to increase the efficiency of the energy captured or absorbed by the resonance elements 102.

As schematically indicated in FIGS. 1 and 2, an energy transfer element 130, as shown by dashed lines, may be associated with the resonance elements 102 to assist in harvesting the energy produced by the resonance elements 102 when exposed to electromagnetic radiation at the appropriate frequency. For example, the energy transfer element 130 may include a capacitor structure coupled with a resonance element 102 so as to develop a charge based on the current produced within the associated resonance element 102. Such an energy transfer element 130 may, for example, be disposed adjacent a resonance element 102 such as adjacent or within an associated cavity 108. As noted above, the energy transfer element 130 is shown schematically in FIGS. 1 and 2. Additional details regarding potential embodiments utilizing more specific embodiments of energy transfer elements are discussed hereinbelow.

In one embodiment, there may be an energy transfer element 130 associated with each resonance element 102 and a plurality of energy transfer elements 130 may be coupled together to a common storage device, such as a battery, or to processing equipment such as a system for converting or conditioning the power provided by the resonance elements 102 and the plurality of energy transfer elements 130. In another embodiment, multiple resonance elements 102 may be electrically coupled with a common energy transfer element 130. In one such embodiment, a plurality of resonance elements 102 may have feedpoints coupled to a common energy transfer element 130.

Figure 3:
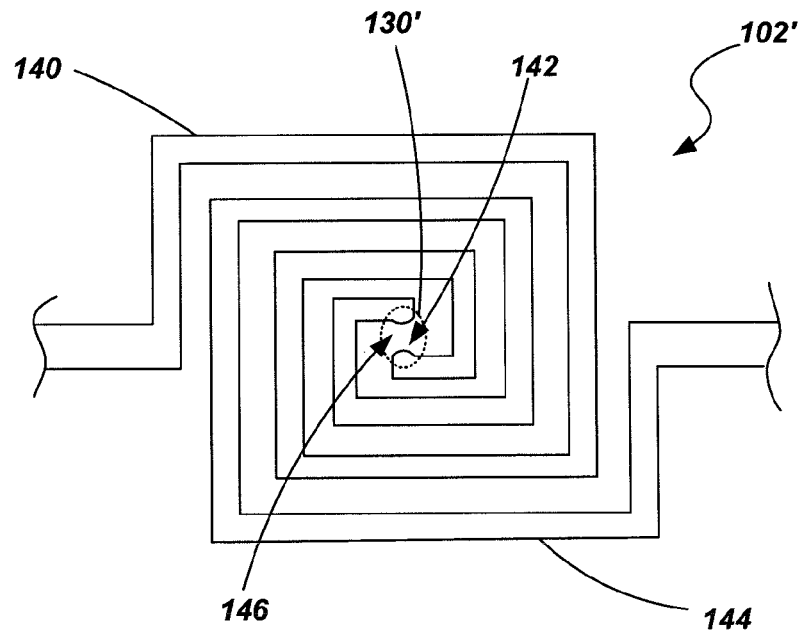
FIG. 3 is a plan view of another element used to harvest energy from electromagnetic radiation in accordance with an embodiment of the present invention.

Turning now to FIG. 3, a resonance element 102' according to another embodiment of the present invention is shown. The resonance element 102' may be configured to exhibit a geometry of what may be termed square or angular spirals. Such spirals may include a first portion 140 that spirals inwardly to a termination point 142 and a second portion 144 that is essentially a reversed image (both vertically and horizontally) and spirals inwardly to a termination point 146. The first portion 140 and the second portion 144 are cooperatively interleaved with one another such that their respective termination points 142 and 146 are positioned proximate one another. The termination points 142 and 146 may act as feedpoints for an energy transfer element 130' such as further described hereinbelow.

Figure 4:
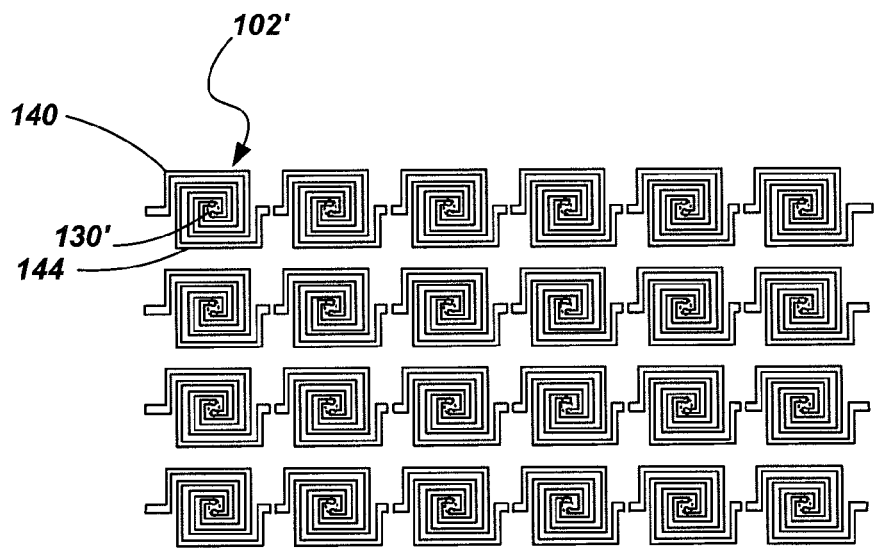
FIG. 4 is an array of elements shown in FIG. 3.

As shown in FIG. 4, an array of resonance elements 102' may be used to form an apparatus configured generally similarly to the embodiment previously described with respect to FIGS. 1 and 2. For example, while not specifically shown in FIGS. 3 and 4, the resonance elements 102' may be disposed on or in a substrate material that has a ground plane associated therewith. Additionally, optical resonance gaps or stand-off layers may be formed in the substrate material and associated with the resonance elements 102'. Such resonance elements 102' may be sized and configured to resonate at a desired frequency (e.g., at a frequency in the visible, IR or near-IR spectra or at frequencies or wavelengths described elsewhere herein). Similarly, optical resonance gaps or stand-off layers may be configured in accordance with an identified frequency of radiation at which the apparatus is intended to be exposed. A density of resonance elements on the array may be from approximately fifty billion per square meter to approximately one hundred ten billion per square meter.

Figure 5:
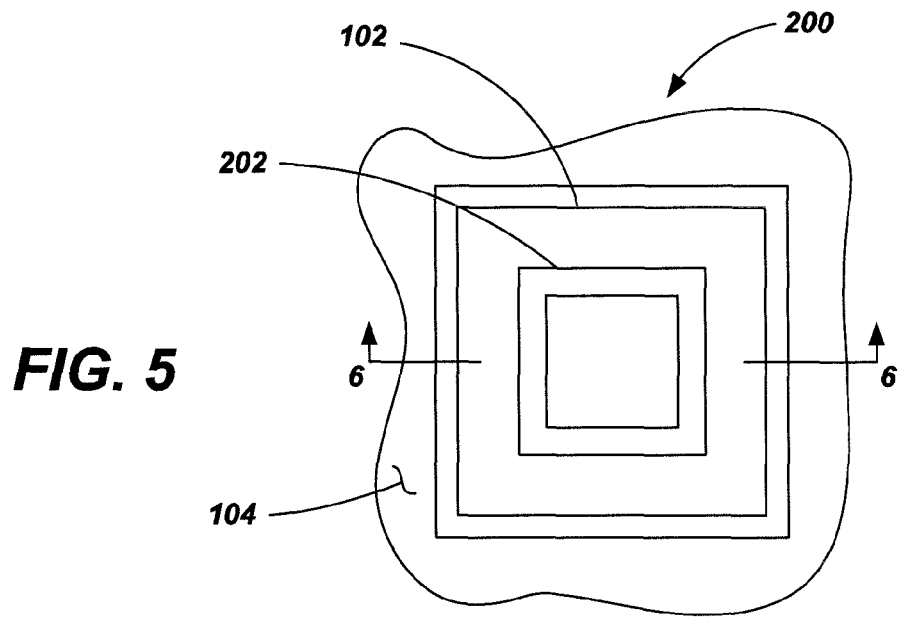
FIG. 5 is a partial plan view of a device used to harvest energy from electromagnetic radiation in accordance with an embodiment of the present invention.
Figure 6:
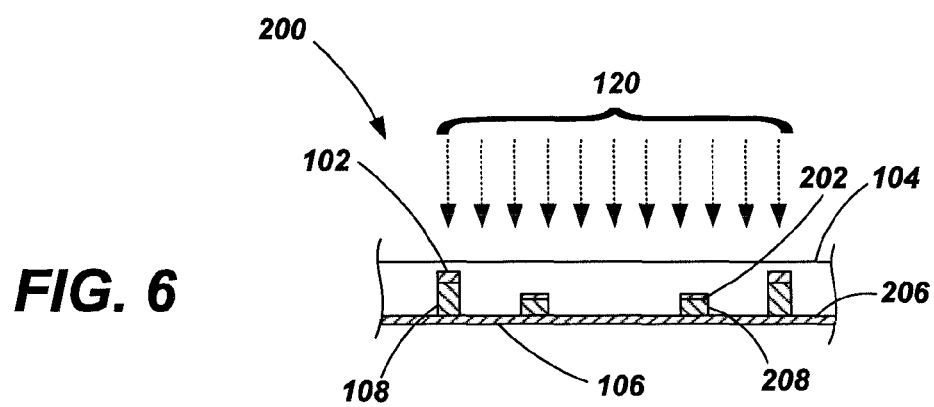
FIG. 6 is a cross-sectional view of a portion of the device as indicated by section line 6-6 as shown in FIG. 5.

Turning now to FIGS. 5 and 6, another embodiment of an apparatus 200 is shown. The apparatus 200 may include one or more resonance elements 102 exhibiting a first configuration (e.g., exhibiting a desired geometry, size, material property or combination thereof) and one or more resonance elements 202 exhibiting a second configuration. For the sake of convenience and clarity in describing such an embodiment, only one of each configuration of resonance elements 102 and 202 is shown.

In the embodiment shown, one resonance element 202 may be nested within the other resonance element 102, although in other embodiments the resonance elements 102 and 202 may be positioned laterally adjacent to one another or in other spatial arrangements. In one embodiment, such as shown in FIGS. 5 and 6, each of the resonance elements 102 and 202 may exhibit similar geometries but different dimensions. In another embodiment, while not specifically shown, a first resonance element may be configured to exhibit a different geometry than that of a second resonance element. For example, a first resonance element may be configured as a loop, while a second resonance element may be configured as a spiral.

As previously described, a cavity 108 may be associated with the resonance element 102 of the first configuration. Likewise, a cavity 208 may be associated with the resonance element 202 exhibiting the second configuration. The two resonance elements 102 and 202, along with their associated cavities 108 and 208, may be located on the same side of a common ground plane 206, as shown in FIG. 6. The two different resonant elements 102 and 202 may be spaced different distances from the common ground plane 106 so as to effectively define two different optical resonant gaps or stand-off layers.

The two resonance elements 102 and 202 are configured to resonate at different frequencies. For example, in one embodiment, one array of resonance elements may be configured to resonate at a frequency associated with visible light, while another array of resonance elements may be configured to resonate at frequencies associated with what may be referred to as "long wavelength IR." Thus, the two resonance elements 102 and 202 may provide an ability to simultaneously harvest energy at multiple, substantially different frequencies, or to harvest energy at substantially different frequencies at different times based on anticipated changing radiation conditions.

Figure 7:
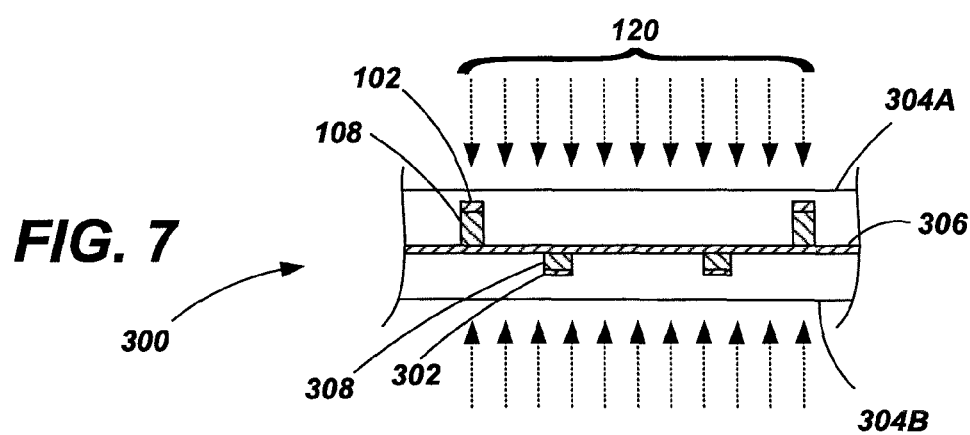
FIG. 7 is a cross-sectional view of a portion of a device used to harvest energy from electromagnetic radiation in accordance with another embodiment of the present invention.

Referring briefly to FIG. 7, a cross-sectional view of an apparatus 300 in accordance with yet another embodiment of the present invention is shown. The apparatus 300 includes one or more resonance elements 102 of a first configuration (e.g., exhibiting a desired geometry, size, material property or combination thereof) and one or more resonance elements 302 exhibiting a second configuration. For the sake of convenience and clarity in describing such an embodiment, only one of each configuration of resonance elements 102 and 302 is shown.

As previously described, a cavity 108 may be associated with the resonance element 102 of the first configuration. Likewise, a cavity 308 may be associated with the resonance element 302 exhibiting the second configuration. The first resonance element 102 and associated cavity 108 (or the plurality of resonance elements 102 and associated cavities 108) may be associated with a first substrate 304A located on a first side of a ground plane 306 while the second resonance element 302 and associated cavity 308 (or plurality thereof) may be associated with another substrate 304B located on an opposing side of the ground plane 306.

The two resonance elements 102 and 302 are configured to resonate at different frequencies. Being on opposite sides of the ground plane 306, the resonance elements 102 and 302 are also oriented for exposure to different sources of radiation. For example, the resonance element or elements 102 of the first configuration may be configured and oriented to harvest energy based on incident radiation from the sun. On the other hand, the resonance element or elements 302 of the second configuration may be configured and oriented to harvest energy that is reradiated from the earth (e.g., at nighttime). Such an apparatus 300 would enable collection of energy from dual sources at different frequencies and being transmitted from different locations.

As will be appreciated by those of ordinary skill in the art, the different embodiments described herein may be combined or modified in a variety of ways. For example, the embodiments described with respect to FIGS. 6 and 7 may be combined such that multiple different configurations of resonance elements 102, 202, 302 may be disposed in or on the associated substrates (e.g., substrates 104, 304A and 304B). Additionally, when multiple resonance elements are being utilized, different geometries may be intermixed in a device. In other words, a single device may include a variety of combinations of geometries including those previously described herein.

Figure 8:
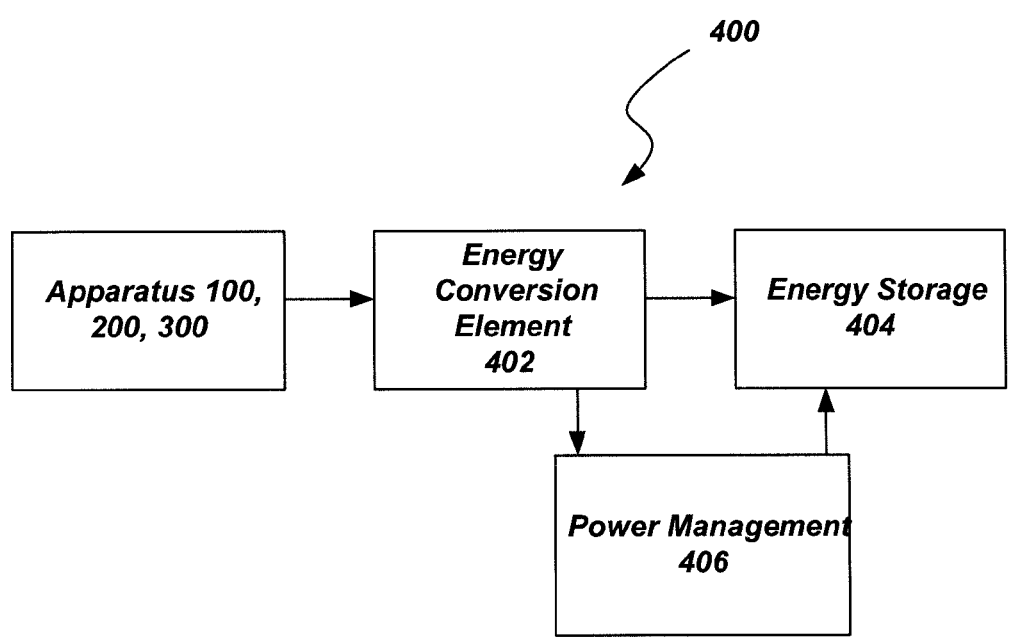
FIG. 8 is a schematic of a system incorporating energy harvesting structures in accordance with another embodiment of the present invention.

Referring now to FIG. 8, a block diagram is shown of an illustrative energy harvesting system 400 according to an embodiment of the present invention. The energy harvesting system 400 includes device 100, and apparatus 200, 300 that capture and concentrate electromagnetic radiation at desired resonant frequencies. The system 400 may further include at least one energy conversion element 402 (that may include energy transfer elements 130 or 130', FIGS. 1-3), which may convert and transfer the electromagnetic energy captured by the device 100, and apparatus 200, 300 during the harvesting process. The system 400 may further comprise an energy storage device 404 such as, for example, a lithium or polymer-form factor battery. In one example, the energy storage device 404 may be trickle-charged by voltage from the energy conversion element 402. The system 400 may further include a power management system 406 for controlling the flow of energy between the energy conversion element 402 and the energy storage device 404. The energy storage device 404 may also be operatively coupled to an external component or system requiring energy (not shown). In some embodiments, one or more systems 400 may be coupled to provide higher currents or voltages as desired.

Figure 9:
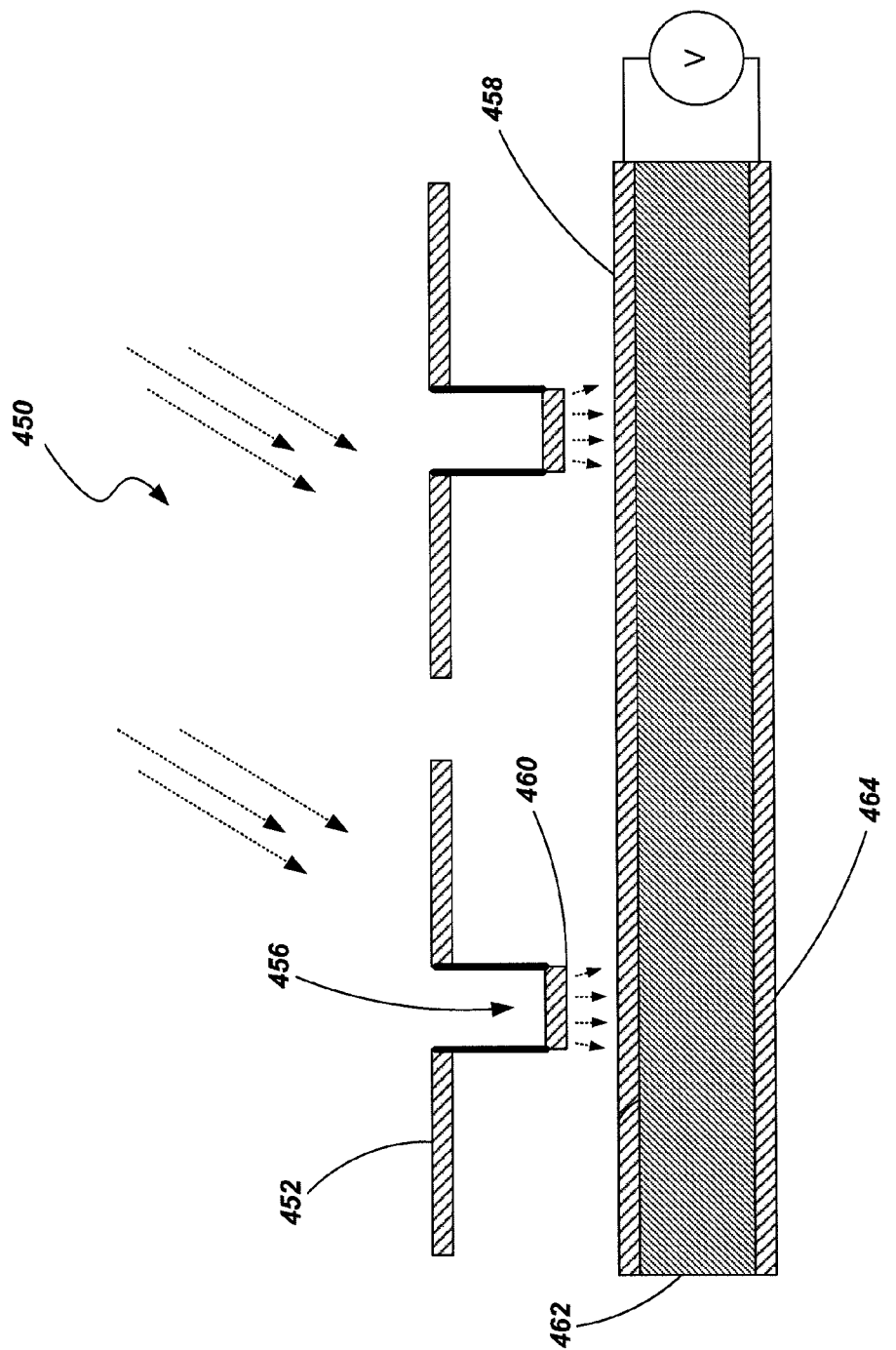
FIG. 9 is a cross-sectional view of certain components of a device for converting energy in accordance with an embodiment of the present invention.

Referring now to FIG. 9, a schematic is shown (showing cross-sections of certain components) of an energy conversion system 450 according to one embodiment of the invention. The energy conversion system 450 includes antenna elements 452 (or resonance elements) parasitically coupled to a capacitive storage plate 458. The antenna elements 452 may be configured as a dipole planar array.

Capacitive coupling is the transfer of energy within an electrical network by means of the capacitance between circuit nodes. Parasitic capacitive coupling can be effected by placing two conductors within close enough proximity such that radiated E-fields crosstalk. Such a system is generally analogous to a charge-coupled device (CCD). Thus, the transfer of Terahertz current from the antenna elements 452 does not require a direct or "physical" electrical connection (e.g., a wire or conductive trace).

The antenna element 452 has a known resistance, such resistance being a function of sheet resistance of, for example, a bulk metal of which the antenna element 452 is fabricated. Electromagnetic energy, as shown by arrows in FIG. 9, impinges on the antenna elements 452 and induces surface currents. The currents propagate to the center feedpoint 456 of each antenna element 452. Each antenna element 452 has a dedicated and electrically isolated capacitive plate 460 that serves as a node for collection of charge, which is proportional to the electromagnetic energy intensity that is exciting the antenna element 452 to a resonance condition. An E-field transfers energy from the center feedpoint 456 to the capacitive plate 458. The capacitive plates 458 and 460 share a common dielectric region 462 and a common underlying grid or plate 464. In effect this serves as a capacitor array, and accumulates an electric charge.

The rate of charge of the capacitor array is a function of the RC (resistance-capacitance) time constant of the system. This time constant is determined by the antenna impedance and capacitance of an associated storage element. The time constant is the time required for the charge (or discharge) current to fall to 1/e (e being Euler's number or the natural logarithm base) of its initial value. After approximately five time constants the capacitor is 99% charged. The capacitor will charge and discharge as the THz alternating current fluctuates.

At some period associated with the rate of charge, a control circuit will transfer the collected charge into an amplifier that converts the charge into a voltage. The control circuit may be implemented with conventional electronic circuitry as will be appreciated by those of ordinary skill in the art. The charge circuit, in effect, rectifies the THz current. The power may be further filtered, conditioned and stored for long-term use. Multiple devices may be interconnected in series to increase wattage.

Figure 10:
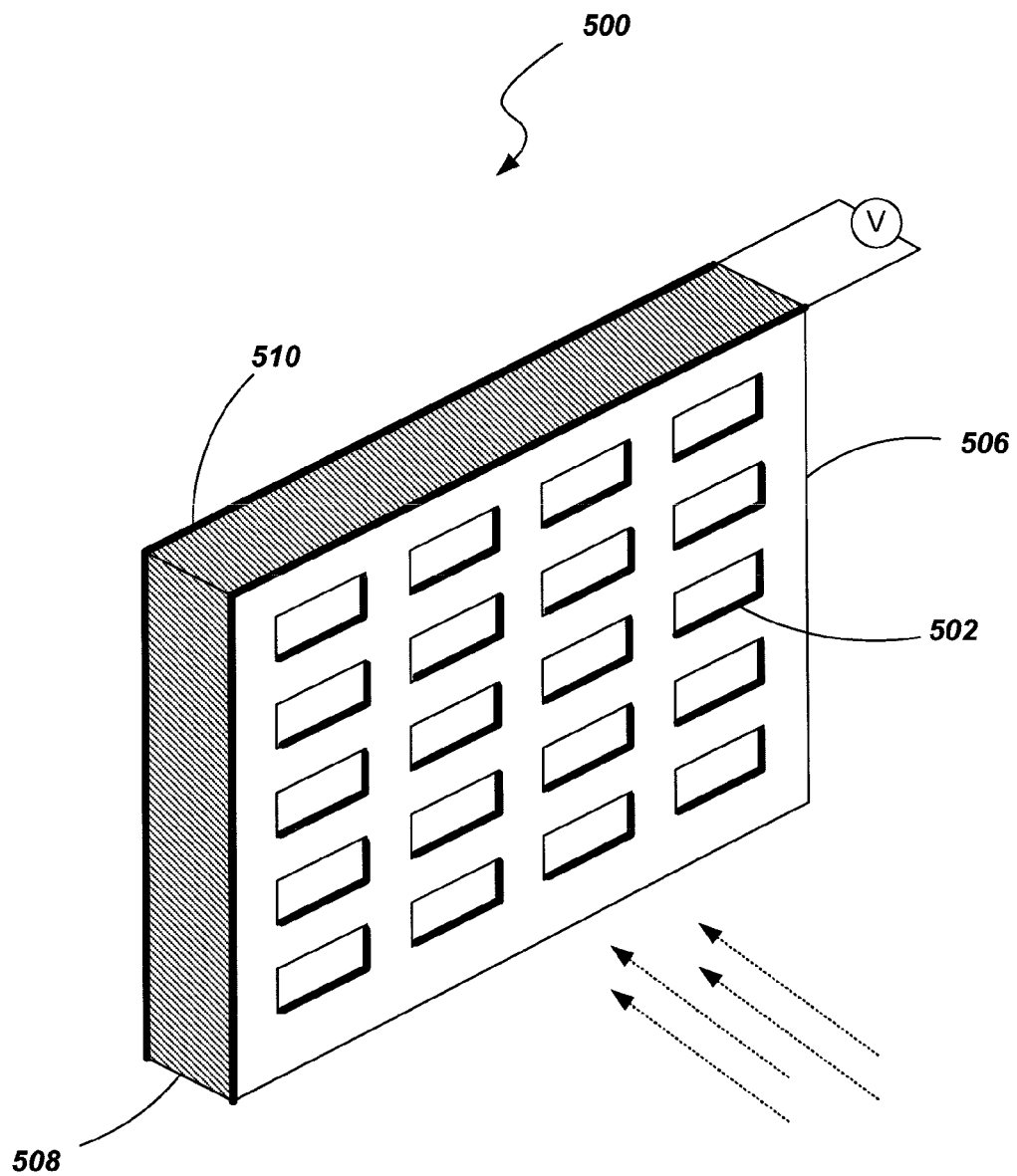
FIG. 10 is a perspective view of a device for converting energy in accordance with an embodiment of the present invention.

Referring to FIG. 10, a perspective view is shown of an energy conversion system 500 according to another embodiment of the present invention. The energy conversion system 500 includes antenna elements directly coupled to capacitive storage elements. The antenna elements may include an array of apertures or slots 502 configured as antenna structures. The slots 502 may be formed, for example, by systematic removal of material from a substantially uniform electrically conductive material 506. The electric field induced in a slot by an incident electromagnetic wave is equivalent to magnetic current density. A voltage distribution results that can be used for capacitive storage of energy.

As noted above, the slots 502 may be fabricated into an electrically conductive material layer 506. This electrically conductive material 506 may also function as an upper capacitive plate. The capacitive storage device is completed by placing a dielectric material 508 between the electrically conductive material 506 and an electrically conductive material layer 510 (which may also serve as a ground plane of the energy conversion system 500, such as discussed hereinabove). In one embodiment, the dielectric material 508 may exhibit a thickness (i.e., the distance between the electrically conductive material 506 and the electrically conductive material layer 510) that is a quarter (¼) wavelength of the wavelength of radiation (shown by arrows) that is anticipated to impinge on the energy conversion system 500. This thickness provides an optical resonance gap or stand-off layer to properly phase the electromagnetic wave for maximum absorption in the antenna plane. Additionally, the dielectric material 508 exhibits a desired permittivity to enable concentration and storage of electrostatic lines of flux.

The capacitance is proportional to the surface area of the electrically conductive materials (506 and 510) and the permittivity of the dielectric material 508. Due to the resonance behavior of the slot antennas, a charge will accumulate on the upper capacitor plate (electrically conductive material 506). A voltage develops across the electrically conductive material 506 and the electrically conductive material layer 510. When there is a difference in electric charge between the plates or electrically conductive materials 506 and 510, an electric field is created in the region therebetween, the electric field being proportional to the amount of charge that has been moved from one plate to the other.

The presently described embodiment provides the ability to directly acquire a capacitor voltage by electrical discharge across the capacitor. The electrically conductive material 506 is configured as a continuous conductor, rather than as the discrete conducting elements, such as have been described with respect to other embodiments hereinabove. Theelectrically conductive material 506 serves as the upper electrode and the electrically conductive material layer 510, or ground plane, serves as the lower electrode. The dielectric material 508 serves as the stand-off layer. A control circuit will transfer the collected voltage to a storage device (not shown). The control circuit may be implemented with conventional electronic circuitry components known to those of ordinary skill in the art. As with other embodiments described herein, multiple devices may be interconnected in series to increase wattage.

Figure 11:
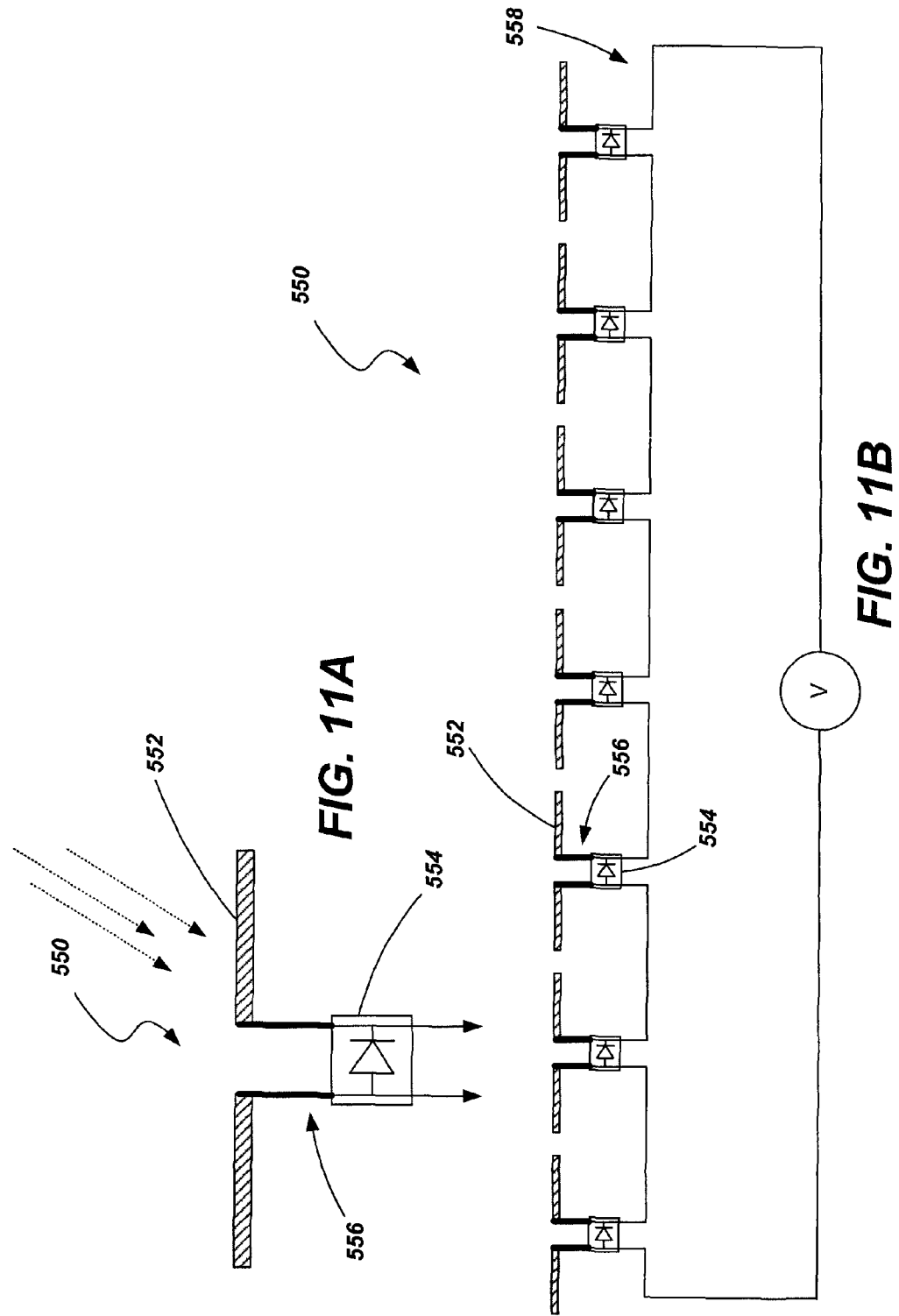
FIGS. 11A and 11B are schematic views, including cross-sectional views of certain components, of an energy transfer device in accordance with an embodiment of the present invention.

Referring to FIGS. 11A and 11B, schematics are shown of an energy conversion system 550 according to another embodiment of the present invention. The energy conversion system 550 includes one or more antenna elements 552 with a rectifier diode element 554 embedded into the antenna element 552. At optical frequencies, the skin depth of an electromagnetic wave in metals is just a few nanometers. This results in a high resistivity causing THz AC (alternating current) currents to dissipate in the form of Joule heating if the transmission line is over a few microns in length. To reduce transmission losses the AC current is substantially immediately rectified. Rectification may be performed using a metal-semiconductor-metal Schottky junction. THz radiation excites surface current waves in the antenna elements 552. The received AC waves are rectified to DC (direct current) with the rectifier diode element 554.

Conventional rectification devices are not suitable for use at the frequencies at which the antenna elements 552 will resonate. Rather, the rectification of electromagnetic waves at the high frequency range of THz radiation is performed with using metal-on-metal (MoM) Schottky-diodes. Such MoM devices include a thin barrier layer and an oxide layer sandwiched between two metal electrodes. An MoM device works when a large enough field causes the tunneling of electrons across the barrier layer. A difference in the work function between the metal Schottky junctions results in high speed rectification. Examples of MoM materials include Au—Si—Ti and InGaAs/InP.

The increased cutoff frequency (to THz) is achieved by reducing the diode capacitance to the attofarad range and also by reducing contact resistance. This is achieved by forming a gate region on the order of, for example, 30 nm in a T-gate configuration. Due to the small junction area, it is believed that low enough junction capacitance will be maintained to sustain THz-rate switching times.

Components may be impedance matched to ensure maximum power transfer between components, to minimize reflection losses, and achieve THz switch speeds. Proper impedance matching may be achieved by connecting the feedpoint of the antenna structure through a co-planar strip (CPS) transmission line 556 to the rectifier diode elements 554. The output of the rectifier diode elements 554 may be DC coupled together. In one embodiment, the rectifier diode elements 554 may be interconnected in series, resulting in a summation of DC voltage. This enables the use of a common power bus 558.

It is noted that in certain embodiments, such as the one described with respect to FIGS. 11A and 11B, the collection elements (i.e., the antenna or resonance elements) may have a termination or feedpoint such as has been described herein, and that electrical current is transferred from the collection element (e.g., antenna element 552) to the transfer or conversion element (e.g., rectifier diode element 554). The current produced by the collection element is AC with a sinusoidal frequency of between $10^{12}$ hertz and $10^{14}$ hertz. The high-efficiency transmission of electrons along a wire at THz frequencies is not a conventional practice. Thus, as described with respect to FIGS. 11A and 11B, this may be accomplished through the use of a co-planar strip transmission line (e.g., transmission line 556) that is specifically designed for high speed and low propagation loss.

Conventional design methods commonly used to design strip transmission lines at microwave frequencies are not fully valid at IR frequencies. Thus, frequency dependent modeling may be employed to characterize transmission line behavior such as has been indicated hereinabove with respect to other components of various embodiments. At THz frequencies the propagating electromagnetic field is not totally confined to the conductor. The resulting dispersive nature of the E-fields may result in potential losses from impacts of the surrounding media, including stray leakage through dielectric materials and substrate boundaries. Design of the CPS takes into account, for example, impedance matching to reduce standing wave ratio (SWR) and tailoring permittivity of adjacent media to reduce refraction in order to improve power transfer from the antenna elements to the conversion elements and improve the efficiency of the device.

It is noted that the CPS conductor size and spacing between the balanced transmission lines also impact characteristic impedance. The optical properties of the strip line metal, including index of refraction (n) and extinction coefficient (k) may be analyzed and used to derive frequency dependent conductivity properties. Tailoring the physical design of the strip line helps to maximize power transfer. The strip line may be designed to match the impedance of the antenna to the impedance of the conversion element. In another embodiment, to further reduce transmission line loss, the conversion element may be physically located substantially co-planar with the antenna.

Figure 12:
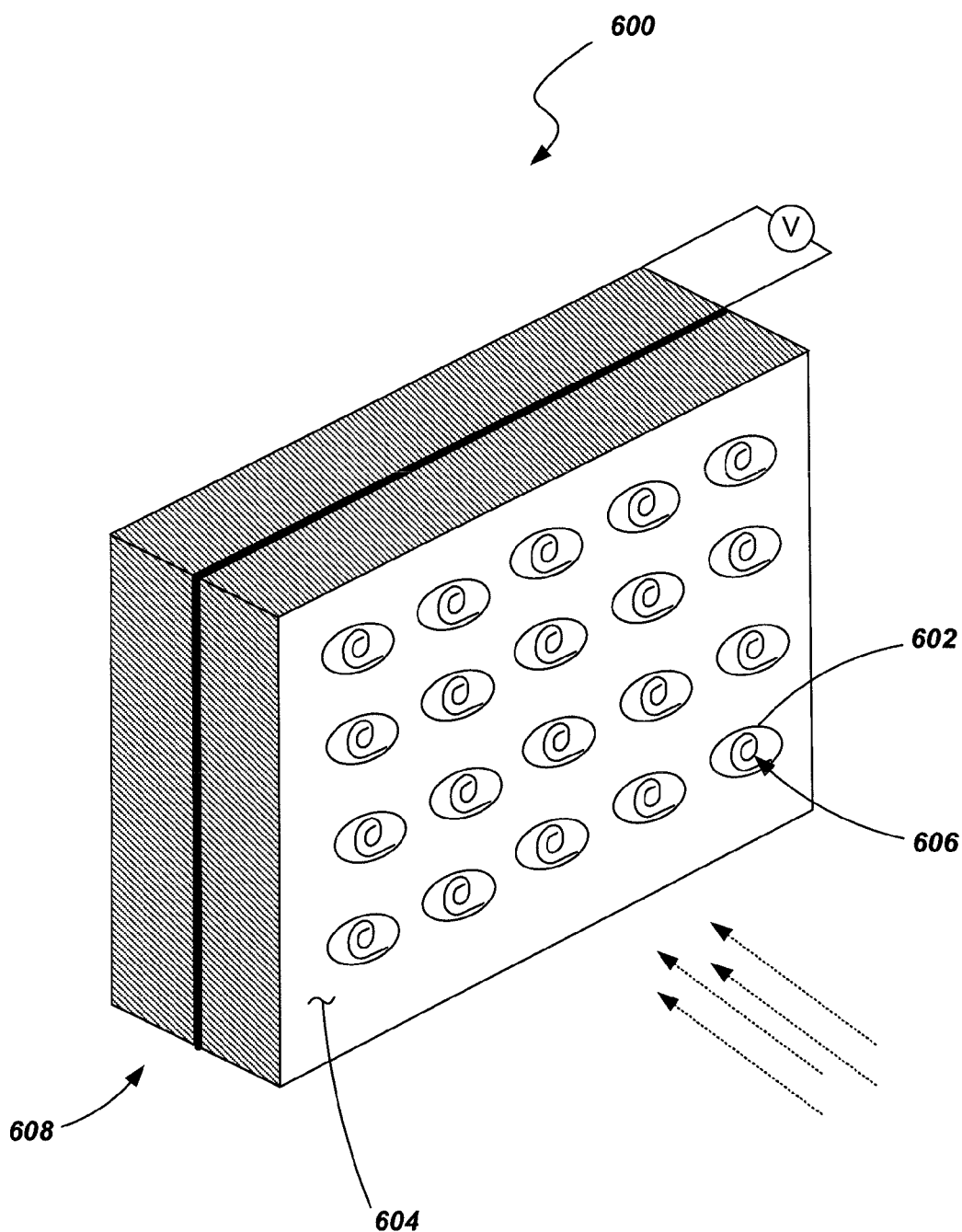
FIG. 12 is a perspective, partial cross-sectional view of an energy transfer device in accordance with an embodiment of the present invention.

Referring to FIG. 12, a perspective, partial cross-sectional view is shown of an energy conversion system 600 system according to another embodiment of the present invention. The energy conversion system 600 may include antenna elements 602 formed on a thin film substrate 604. The thin film substrate 604 may include a flexible material such as, for example, polyethylene. A ground plane is not utilized in this embodiment. The antenna elements 602 may be configured to collect electromagnetic radiation in the visible and infrared bands. As shown in FIG. 12, the antenna elements 602 may include spiral loop antenna elements having a central feedpoint 606. The complementary geometry of the antenna elements 602 generate surface currents that are additive and focus radiant energy at the central feedpoint 606 of the antenna elements 602. A photovoltaic (PV) material 608 may be placed in proximity to the antenna's feedpoint 606 for conversion of the energy collected by the antenna elements 602.

In the currently described embodiment, the thin film substrate 604 and associated antenna elements 602 may be overlaid, laminated or bonded to photovoltaic (PV) material 608, which may include, for example, commercially available PV materials. The antenna elements 602 capture and focus energy (shown by arrows) into each associated feedpoint 606 of each antenna element 602 analogous to the focal point of an optical lens. The antenna elements 602 are designed for resonance at the bandgap energy of the PV material 608. The concentrated, radiant energy is capacitively coupled (no direct wiring required) to the PV material 608. This induces electron-hole transfer in the PV material 608 and initiates the solar energy conversion process. Conventional methods used to collect and store DC energy from the PV material may then be implemented.

The use of antenna elements (e.g., micro-antennas or nano-antennas), with an omni-directional field-of-view, such as provided by the antenna elements described herein, enables modification of the angular reception characteristics of conventional solar cells, leading to higher collection efficiency independent of the angle of incidence of the sun. It is further noted that a-Si, amorphous silicon (a leading material for PV) has an intrinsic light induced degradation. In the presently described embodiment, the antenna layer serves as a "top coat" or protective layer for the PV material 608 providing environmental protection and reducing the effects of degradation.

Figure 13:
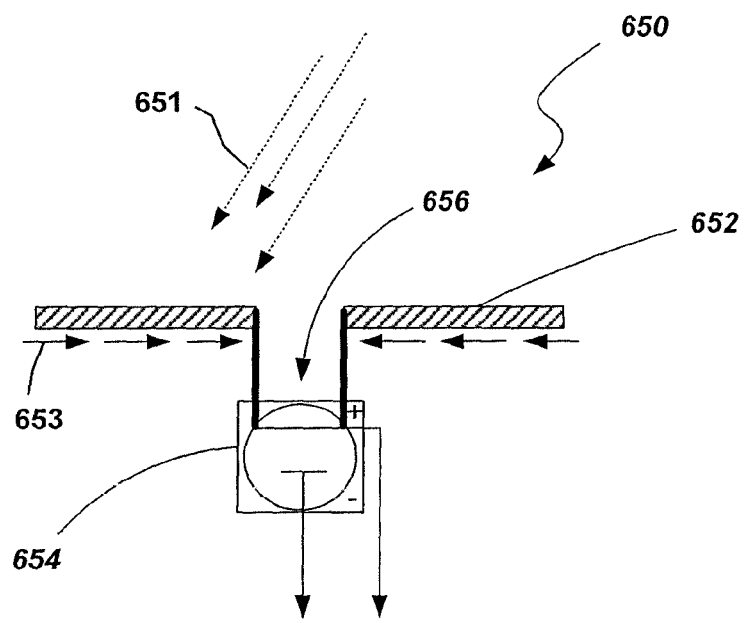
FIG. 13 is a schematic view of a device according to an embodiment of the present invention.

Referring to FIG. 13, a schematic is shown of an energy conversion system 650 according to another embodiment of the present invention. In this embodiment, an antenna element 652 may have a PV material 654 embedded in, or coupled with, the feedpoint 656 thereof. The THz currents 653 of the antenna element 652 are directly coupled to the PV material 654, achieving a high efficiency electron-hole transfer in the PV material 654 and corresponding generation of DC current. Different antenna geometries may be designed with peak resonances to match specialized multi-band gapped engineered PV materials. By combining the efficiency, bandwidth, and omni-directional field-of-view of the antenna element 652 with exotic energy capturing materials, it is possible to reduce the amount and cost of PV material 654 required. This enables an economical manufacturing of high power density PV devices.

The embodiments described with respect to FIGS. 12 and 13 effectively concentrate infrared and visible energy 651 onto photovoltaic materials to greatly improve operational efficiency, durability, and cost effectiveness of solar generated electricity. The use of micro-antennas and nano-antennas make it possible to use sub-wavelength sized PV materials such as bandgap-engineering superlattice materials.

Figure 14:
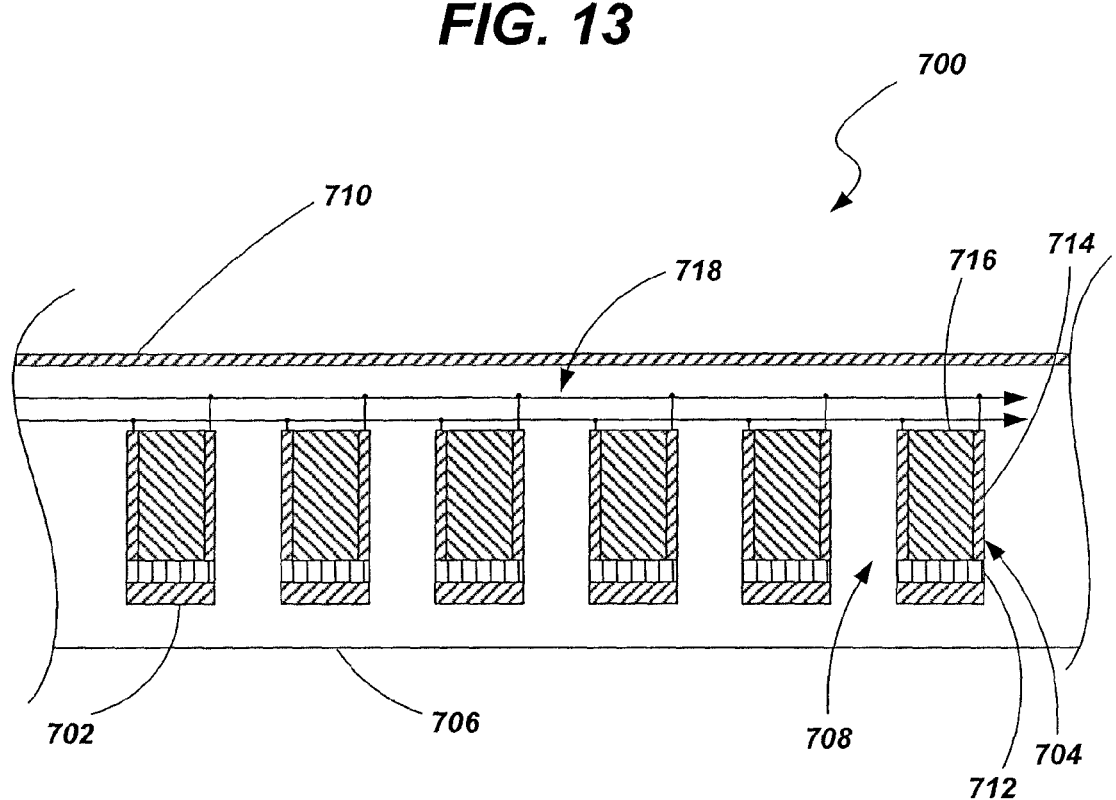
FIG. 14 is a schematic view, including a cross-sectional view of certain components, of an energy transfer device in accordance with an embodiment of the present invention.

Referring now to FIG. 14, a schematic of an energy conversion system 700 is shown in accordance with yet another embodiment of the present invention. The energy conversion system 700 includes a plurality of antenna elements 702 disposed in cavities 704 formed in a substrate 706. Capacitors 708 may also be disposed in the cavities 704 between the antenna elements 702 and the ground plane 710 to function as energy transfer elements. For example, a dielectric material 712 may be disposed on top of the antenna elements 702 to electrically insulate them from other components. The sidewalls of the cavities 704 may be lined with, for example, carbon nanotubes 714. Carbon nanostructures have excellent nanoporosity geometries which, it is believed, will enable high efficiency dielectric and energy storage properties. A dielectric material 716 may be disposed in the remaining portion of the cavity 704 to complete the capacitor structure. The capacitors 708 may be coupled to a common power bus 718.

Embodiments of the present invention, such as have been described above, may include apparatuses or devices that are amenable to installation and use in a variety of locations and conjunction with a variety of applications. For example, since the apparatuses may be formed using flexible substrates, they may be integrated into structures or devices having complex and contoured surfaces. Such apparatuses may be integrated into, for example, clothing, backpacks, automobiles (or other transportation apparatuses), consumer electronics, and a variety of other types of devices and structures.

Although the present invention has been described with reference to particular embodiments, the present invention is not limited to these described embodiments. Rather, the present invention is limited only by the appended claims, which include within their scope all equivalent devices or methods that operate according to the principles of the present invention as described.

What is claimed is:

1. An energy harvesting device, comprising:
   at least a first resonance element being sized and configured to have a resonant frequency between 20 THz and approximately 1,000 THz;
   at least a second resonance element being sized and configured to have a resonant frequency different from the resonant frequency of the at least a first resonance element; and
   a ground plane, wherein the at least a first resonance element is separated from the ground plane by a first distance, and wherein the at least a second resonance element is separated from the ground plane by a second distance that is different than the first distance.

2. The energy harvesting device of claim 1, further comprising at least one energy transfer element associated with at least one of the at least a first resonance element and the at least a second resonance element.

3. The energy harvesting device of claim 2, wherein the at least one energy transfer element includes a capacitor coupling the associated one of the at least a first resonance element and the at least a second resonance element with a ground plane.

4. The energy harvesting device of claim 1, wherein the at least a first resonance element and the at least a second resonance element each comprise a plurality of resonance elements arranged in a pattern having a density range of from approximately fifty billion per square meter to approximately one hundred ten billion per square meter.

5. The energy harvesting device of claim 1, wherein the at least a first resonance element is oriented for exposure to a different source of radiation than the at least a second resonance element.

6. The energy harvesting device of claim 1, wherein:
   the separation between the ground plane and the at least a first resonance element includes a first optical resonance gap; and
   the separation between the ground plane and the at least a second resonance element includes a second optical resonance gap.

7. The energy harvesting device of claim 6, wherein the at least a first resonance element comprises a plurality of resonance elements arranged in a first array and wherein the at least a second resonance element comprises a plurality of resonance elements arranged in a second array.

8. The energy harvesting device of claim 1, wherein the at least a first resonance element and the at least a second resonance element are positioned on a single surface of the ground plane.

9. The energy harvesting device of claim 1, wherein the at least a first resonance element and the at least a second resonance element are positioned on opposing sides of the ground plane.

10. An energy harvesting device, comprising:
    at least a first resonance element being sized and configured to have a resonant frequency between 20 THz and approximately 1,000 THz; and
    at least a second resonance element being sized and configured to have a resonant frequency different from the resonant frequency of the at least a first resonance element, wherein a first optical resonance gap extends a distance between a ground plane and the at least a first resonance element approximately one-quarter wavelength of a wavelength of the at least a first resonance element's resonant frequency.

11. The energy harvesting device of claim 10, wherein a second optical resonance gap extends a distance between the ground plane and the at least a second resonance element approximately one-quarter wavelength of a wavelength of the at least a second resonance element's resonant frequency.

12. The energy harvesting device of claim 10, wherein the at least a second resonance element is nested within the at least a first resonance element.

13. The energy harvesting device of claim 10, wherein the at least a second resonance element is positioned laterally adjacent to the at least a first resonance element.

14. The energy harvesting device of claim 10, wherein the at least a first resonance element and the at least a second resonance element have substantially similar geometries but substantially different dimensions.

15. The energy harvesting device of claim 10, wherein the at least a first resonance element and the at least a second resonance element have substantially different geometries.

16. The energy harvesting device of claim 15, wherein the geometries are selected from the group consisting of a circular loop, a concentric loop, a square spiral, a circular spiral, a slot, and a cross.

17. An energy harvesting device, comprising:
    at least a first resonance element being sized and configured to have a resonant frequency between 20 THz and approximately 1,000 THz; and
    at least a second resonance element being sized and configured to have a resonant frequency different from the resonant frequency of the at least a first resonance element, wherein the at least a first resonance element is spaced from a ground plane a first distance to define a first optical resonance gap and the at least a second resonance element is spaced from the ground plane a second distance to define a second optical resonance gap different than the first optical resonance gap.

18. The energy harvesting device of claim 17, wherein the at least a first resonance element and the first optical resonance gap is located on a first side of the ground plane, and the at least a second resonance element and the second optical resonance gap is located on a second side of the ground plane.

19. The energy harvesting device of claim 18, wherein the ground plane is oriented such that the first side faces the sun and the second side faces the earth.

* * * * *

UNITED STATES PATENT AND TRADEMARK OFFICE
CERTIFICATE OF CORRECTION

PATENT NO.        : 8,283,619 B2                                         Page 1 of 1
APPLICATION NO.   : 13/179329
DATED             : October 9, 2012
INVENTOR(S)       : Steven D. Novack et al.

It is certified that error appears in the above-identified patent and that said Letters Patent is hereby corrected as shown below:

In the specification:
COLUMN 1,   LINE 24,    change "Dec. 6, 2011." to --Dec. 6, 2011,--
COLUMN 1,   LINE 26,    change "DEVICES" to --DEVICES,--
COLUMN 12,  LINE 37,    change "Theelectrically" to --The electrically--

Signed and Sealed this
Sixth Day of May, 2014

Michelle K. Lee
*Deputy Director of the United States Patent and Trademark Office*